United States Patent
Liu et al.

(10) Patent No.: US 10,484,941 B2
(45) Date of Patent: Nov. 19, 2019

(54) WAKE-UP RADIO ASSISTED WLAN POWER SAVING TECHNOLOGIES

(71) Applicant: Apple Inc., Cupertino, CA (US)

(72) Inventors: Yong Liu, Campbell, CA (US); Christiaan A. Hartman, San Jose, CA (US); Siegfried Lehmann, Sunnyvale, CA (US); Su Khiong Yong, Palo Alto, CA (US); Guoqing Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 15/631,351

(22) Filed: Jun. 23, 2017

(65) Prior Publication Data

US 2018/0027490 A1     Jan. 25, 2018

Related U.S. Application Data

(60) Provisional application No. 62/366,445, filed on Jul. 25, 2016.

(51) Int. Cl.
*H04W 52/02*     (2009.01)
*G08C 17/02*     (2006.01)
(Continued)

(52) U.S. Cl.
CPC ............ *H04W 52/02* (2013.01); *G08C 17/02* (2013.01); *H04B 7/18532* (2013.01);
(Continued)

(58) Field of Classification Search
CPC .......................... H04W 52/02; H04W 84/045
See application file for complete search history.

(56) References Cited

U.S. PATENT DOCUMENTS 7,299,009 B2    11/2007  Hussmann
8,478,360 B2     7/2013  Soliman
(Continued)

OTHER PUBLICATIONS

European Search Report, European Application No. EP 17 182 044.2, dated Nov. 20, 2017, 9 pages.

*Primary Examiner* — Zhiren Qin
(74) *Attorney, Agent, or Firm* — Meyertons Hood Kivlin Kowert and Goetzel PC; Jeffrey C. Hood; Matthew C. Washburn

(57) ABSTRACT

A dual-radio AP including both a high-power (e.g., Wi-Fi) radio and a low-power (e.g., BLE) radio may support an assisted wakeup service for a power-limited dual-radio mobile device (STA). The power-limited STA may register with the AP for the assisted wakeup service, and may then disable its Wi-Fi radio (or otherwise initiate a lower-power mode). The power-limited STA may receive a BLE communication indicating the AP has pending Wi-Fi transmissions or updates applicable to the power-limited STA. In response, the power-limited STA may turn on its Wi-Fi radio and receive the pending transmissions or updates from the AP. If an AP does not include a low-power radio, then a high-power/low-power dual-radio STA that is not power-limited may serve as an assisted wakeup service proxy. The proxy may scan and trace the Wi-Fi beacons from the AP, and generate the BLE communication to the power-limited STA on behalf of the AP.

17 Claims, 8 Drawing Sheets

(51) Int. Cl.
  *H04B 7/185*  (2006.01)
  *H04W 68/02*  (2009.01)
  *H04W 84/04*  (2009.01)
  *H04L 29/06*  (2006.01)
  *H04W 48/12*  (2009.01)
  *H04W 84/12*  (2009.01)
  *H04W 88/06*  (2009.01)
  *H04W 88/10*  (2009.01)
  *H04W 4/80*  (2018.01)

(52) U.S. Cl.
  CPC ......... *H04L 69/18* (2013.01); *H04W 52/0206* (2013.01); *H04W 52/0216* (2013.01); *H04W 52/0229* (2013.01); *H04W 68/02* (2013.01); *H04W 84/045* (2013.01); *H04W 4/80* (2018.02); *H04W 48/12* (2013.01); *H04W 84/12* (2013.01); *H04W 88/06* (2013.01); *H04W 88/10* (2013.01); *Y02D 70/00* (2018.01); *Y02D 70/10* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/26* (2018.01); *Y02D 70/446* (2018.01)

(56) References Cited

U.S. PATENT DOCUMENTS

| | | | |
|---|---|---|---|
| 8,639,273 B2 | 1/2014 | Chaubey et al. | |
| 9,167,521 B2 | 10/2015 | Lin | |
| 2008/0146253 A1* | 6/2008 | Wentink | H04W 68/02 455/458 |
| 2015/0348025 A1* | 12/2015 | Brown | G06Q 20/3821 705/41 |
| 2015/0350334 A1 | 12/2015 | Liu et al. | |
| 2016/0066274 A1* | 3/2016 | Pujari | H04W 52/0235 370/311 |
| 2016/0112947 A1* | 4/2016 | Sahoo | H04W 28/0221 370/311 |
| 2016/0150357 A1 | 5/2016 | Jung et al. | |
| 2016/0353382 A1* | 12/2016 | Xue | H04W 52/0251 |

* cited by examiner

WAKE-UP RADIO ASSISTED WLAN POWER SAVING TECHNOLOGIES

PRIORITY INFORMATION

This application claims priority to U.S. provisional patent application Ser. No. 62/366,445, titled "Wake-Up Radio Assisted WLAN Power Saving Technologies," by Yong Liu, et al., filed Jul. 25, 2016, which is hereby incorporated by reference in its entirety as though fully and completely set forth herein.

FIELD

The present disclosure relates to wireless communication, including to techniques for assisted wakeup services in dual-radio WLAN systems such as IEEE 802.11/Bluetooth Low Energy wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Specifically, some device classes that are simple, small, and/or lightweight, such as wearable devices, may have more severe battery limitations than other wireless communication devices. It would therefore be desirable to provide improved power efficiency in wireless communications with various types of mobile devices, including power-limited devices.

SUMMARY

This document describes, inter alia, methods for implementing assisted wakeup services in dual-radio WLAN devices, such as devices including both an IEEE 802.11 (Wi-Fi) radio and a Bluetooth Low Energy (BLE) radio, or other radios, and describes wireless devices configured to implement the described methods.

A dual-radio AP including both a high-power (e.g., Wi-Fi) radio and a low-power (e.g., BLE) radio may support an assisted wakeup service for a power-limited dual-radio mobile device (STA). The power-limited STA may register with the AP for the assisted wakeup service, and may then turn of its high-power radio. The power-limited STA may receive a low-power-radio communication indicating that the AP has pending high-power-radio transmissions or updates applicable to the power-limited STA. In response, the power-limited STA may turn on its high-power radio, and receive the pending transmissions or updates from the AP. If an AP does not include a low-power radio, then a high-power/low-power dual-radio STA that is not power-limited may serve as an assisted wakeup service proxy. The proxy may scan and trace the high-power-radio beacons from the AP, and generate the low-power-radio communication to the power-limited STA on behalf of the AP.

A wireless communication device (e.g. a power-limited STA) is disclosed, including a high-power communication module configured to communicate according to a first communication protocol (e.g. a Wi-Fi protocol); a low-power communication module configured to communicate according to a second, different communication protocol (e.g., a BLE protocol); and at least one processor communicatively coupled to the high-power communication module and the low-power communication module. The wireless communication device may be configured to receive a first communication (e.g., a low-power update (LPU) message) via the low-power communication module, according to the second communication protocol, while the high-power communication module is in an inactive state. The wireless device may be further configured to determine that the first communication includes an indication (e.g., a traffic indication map (TIM)) that an access point has data available to send to the wireless communication device according to the first protocol. In response to receiving this determining, the wireless communication device may transition the high-power communication module from the inactive state (e.g., a sleep state) to an active state (e.g., a wake state). The wireless communication device may subsequently receive a second communication (e.g., a data message) including the data via the high-power communication module while the high-power communication module is in the active state.

In some embodiments, the first communication may be received from the access point. In other embodiments, the first communication may be received from a proxy device that is not the access point.

In some embodiments, the low-power communication module may be configured to periodically transition from an inactive state to an active state to scan for the first communication. In some embodiments, the low-power communication module may be configured to determine that the first communication indicates that an access point has data available to send to the wireless communication device according to the first protocol, and cause the high-power communication module to transition from the inactive state to the active state. In some embodiments, the low-power communication module is configured to transmit an advertisement message, wherein the first communication is responsive to the advertisement message.

In some embodiments, the wireless communication device may be further configured to transition the low-power communication module from an inactive state to an active state, while the high-power communication module is in the inactive state, and transmit an advertisement message via the low-power communication module, according to the second communication protocol. The wireless communication device may then determine whether a scan request message was received via the low-power communication module, responsive to the advertisement message, within a predetermined amount of time following the transmitting the advertisement message. In response to determining that the scan request message was not received within the predetermined amount of time, the wireless communication device may transition the low-power communication module from the active state to the inactive state. In response to determining that the scan request message was received within the predetermined amount of time, the wireless communication device may transmit a scan response message via the low-power communication module, indicating that the wireless communication device will scan for further communication according to the second communication protocol, wherein the first communication is responsive to the scan response message.

In some embodiments, the wireless communication device may be further configured to receive from the access point a first beacon according to the first communication protocol, and receive from the access point a second beacon according to the second communication protocol. At least one of the first beacon or the second beacon may indicate that the access point is capable of including in the first communication, according to the second communication protocol, an indication that the access point has data available to send to the wireless communication device according to the first protocol. In some embodiments, the wireless communication device may be further configured to instruct the access point to include in the first communication according to the second communication protocol, an indication that the access point has data available to send to the wireless communication device according to the first protocol, and then cause the high-power communication module to enter the inactive state after the instructing.

A wireless communication device (e.g. an assisted wakeup service proxy) is disclosed, including a high-power communication module configured to communicate according to a first communication protocol (e.g. a Wi-Fi protocol); a low-power communication module configured to communicate according to a second, different communication protocol (e.g., a BLE protocol); and at least one processor communicatively coupled to the high-power communication module and the low-power communication module. The wireless communication device may be configured to receive a first communication (e.g., a beacon message) via the high-power radio (e.g., from an access point), the first communication including an indication (e.g., a TIM) that the access point has data available to transmit to a recipient device according to the first communication protocol. The wireless device may be further configured to transmit a second communication (e.g., an LPU message) to the recipient device via the low-power radio, the second communication including at least the portion of the indication (e.g., the TIM) indicating that the access point has data available to transmit to the recipient device according to the first communication protocol.

In some embodiments, the wireless communication device may be further configured to receive from the access point an indication that the access point supports an assisted wakeup service, and to provide to the recipient device an indication that the wireless communication device supports the assisted wakeup service. The wireless communication device may be further configured to receive from the recipient device a request to implement the assisted wakeup service, wherein implementing the assisted wakeup service includes transmitting the second communication via the low-powered radio.

In some embodiments, the wireless communication device may be further configured to determine that the TIM includes a block of identifiers of devices registered for assisted wakeup service, the block of identifiers including an identifier of the recipient device. The at least the portion of the TIM included in the second communication may include the block of identifiers assigned to devices registered for assisted wakeup service.

In some embodiments, the wireless communication device may be further configured to receive from the recipient device, prior to the receiving the first communication, an instruction to forward to the recipient device, according to the second communication protocol, the indication that the access point has data available to transmit to the recipient device according to the first communication protocol.

In some embodiments, the wireless communication device may be further configured to receive from the recipient device an advertising message according to the second communication protocol, wherein transmitting the second communication is responsive to the advertising message.

In some embodiments, the wireless communication device may be further configured to receive an advertising message from the recipient device via the low-power radio, according to the second communication protocol. The advertising message may indicate that the recipient device is prepared to receive communications according to the second communication protocol. The wireless communication device may transmit a scan request message via the low-power radio, responsive to the advertising message, the scan request message instructing the recipient device to scan for further communication according to the second communication protocol. The wireless communication device may receive a scan response message via the low-power radio, responsive to the scan request message. The scan response message may acknowledge that the recipient device will scan for further communication according to the second communication protocol. Transmitting the second communication may be responsive to the scan response message.

In some embodiments, the second communication may further include an indication of time until the next multicast transmission by the access point, and a beacon update sequence number. The indication of time and the beacon update sequence number may be derived from the first communication.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
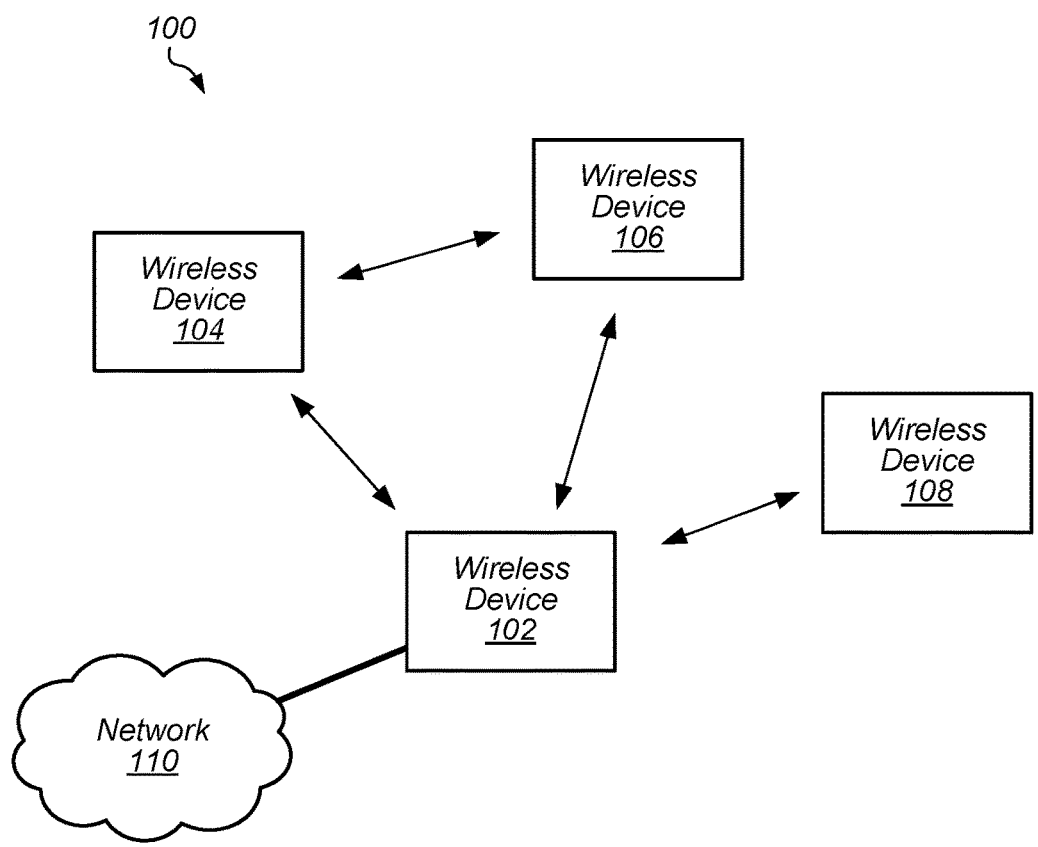
FIGS. 1-2 illustrate exemplary (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Incorporation by Reference

The following is hereby incorporated by reference in its entirety as though fully and completely set forth herein:
IEEE Std 802.11-2012

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—any of various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include both cellular and Wi-Fi communication capabilities, such as laptop computers (e.g., MacBook™), portable gaming devices (e.g., Nintendo DS™, PlayStation Portable™ Gameboy Advance™), portable Internet devices, and other handheld devices, as well as wearable devices such as wrist-watches, headphones, pendants, earpieces, etc. In general, the term "mobile device" can be broadly defined to encompass any electronic, computing, and/or telecommunications device (or combination of devices) which is easily transported by a user and capable of wireless communication using WLAN.

Access Point—The term "Access Point" has the full breadth of its ordinary meaning, and at least includes a wireless communication device which offers connectivity to a wireless local area network (WLAN), such as a Wi-Fi network.

Wireless Device—any of various types of computer systems devices which performs wireless communications using WLAN communications. As used herein, the term "wireless device" may refer to a mobile device, as defined above, or to a stationary device, such as a wireless base station. For example, a wireless device may be any type of wireless station of an 802.11 system, such as an access point (AP) or a client station (STA).

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name Wi-Fi™. A WLAN network is different from a cellular network.

Link Budget Limited—includes the full breadth of its ordinary meaning, and at least includes a characteristic of a wireless device that exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over a WLAN with an access point may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over a WLAN, but may be temporarily link budget limited due to current communication conditions, e.g., a smart phone being at the edge of a WLAN coverage area, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi", and may be included in the term "wireless local area network (WLAN)" technology.

Figure 2:
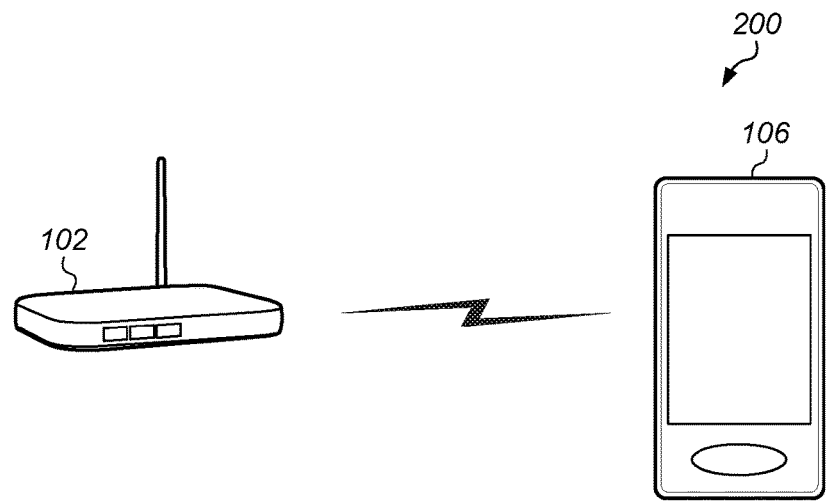

FIGS. 1-2—Communication System

FIG. 1 illustrates an exemplary (and simplified) wireless communication system 100, according to some embodiments. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to perform generational auto-detection in wireless communication according to aspects of the present disclosure.

One or more of the wireless devices may be equipped to communicate with one or more external networks. For example, as shown, wireless device 102 may be communicatively coupled to network 110. The external network(s) may be any of a variety of types of networks, such as a cellular service provider's core network (e.g., via a cellular base station), the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi), and at least one peer-to-peer wireless communication protocol (e.g., BT, BLE, Wi-Fi peer-to-peer, etc.), and/or at least one cellular communication protocol (e.g., GSM, UMTS, LTE, LTE-Advanced (LTE-A), 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS) (e.g., GPS, GLONASS, or COMPASS), one or more mobile television broadcasting standards (e.g., ATSC-M/H or DVB-H), and/or any other wireless communication protocol, if desired. Other combinations of wireless communication standards (including more than two wireless communication standards) are also possible.

Any or all of wireless devices 102-108 may be configured to perform any of the method embodiments described herein, or any portion of any of the method embodiments described herein, for example, to include implementing any of various assisted wakeup services.

FIG. 2 illustrates an exemplary wireless communication system 200 in which aspects of the system 100 of FIG. 1 are represented, according to some embodiments. As shown in the illustrated system, wireless device 106 may be a mobile station (STA) 106 and wireless device 102 may be an access point 102 (also referred to as an "AP", or alternatively as a "base station" or "BS"). The STA 106 may be a user device with WLAN (e.g., Wi-Fi) communication capability such as a mobile phone, a hand-held device, a wearable device, a computer or a tablet computer, or virtually any type of wireless device. The AP 102 may be an access point device with WLAN (e.g., Wi-Fi) communication capability such as a wireless router or other wireless access point. Either or both of the AP 102 and the STA 106 may further have communication capability via additional RATs, such as Bluetooth or Bluetooth LE.

Either or both of the AP 102 and the STA 106 may include a processor that is configured to execute program instructions stored in memory. Either or both of the AP 102 and the STA 106 may perform any of the method embodiments described herein, e.g., by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
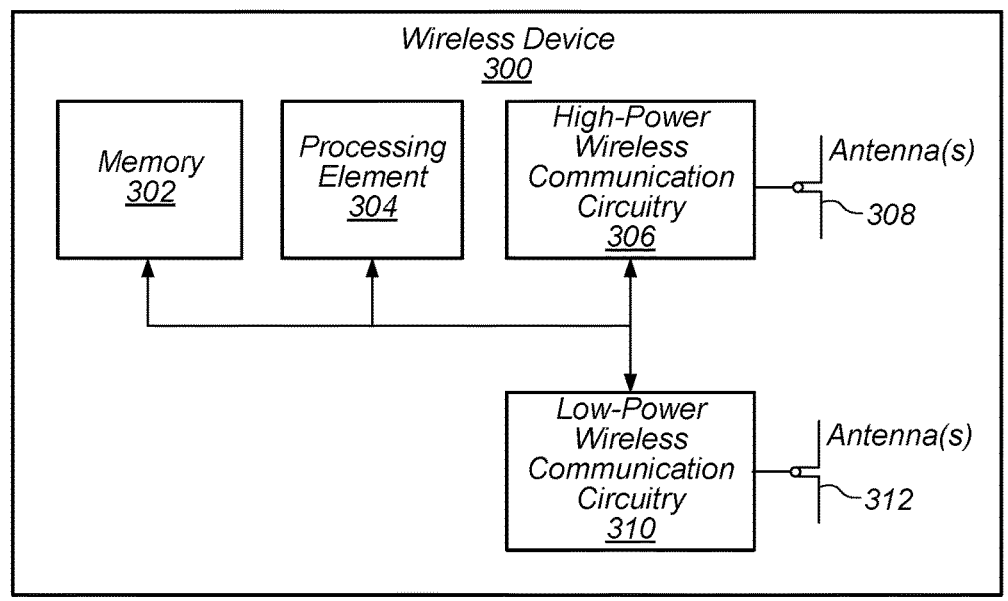
FIG. 3 illustrates a block diagram of an exemplary wireless device, according to some embodiments.

FIG. 3—Exemplary Block Diagram of a Wireless Device

FIG. 3 illustrates an exemplary block diagram of a wireless device 300, which may be configured for use in conjunction with various aspects of the present disclosure, according to some embodiments. The device 300 may be any of a variety of types of device and may be configured to perform any of a variety of types of functionality. For example, the device 300 may be a substantially portable device (a mobile device), such as a mobile phone, a personal productivity device, a computer or a tablet computer, a handheld gaming console, a portable media player, etc. Alternatively, the device 300 may be a substantially stationary device, such as a television, a subwoofer, speaker, or other audio rendering device, a wireless access point, a set-top box, etc., if desired. The wireless device 300 may include, or be included in, either an AP or a mobile device, such as any of the wireless devices 102-108.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include high-power wireless communication circuitry 306. The high-power wireless communication circuitry 306 may include analog and/or digital circuitry components, and may alternatively be referred to as a "radio" or "module". In general, a radio may include any combination of a baseband processor, analog RF signal processing circuitry (e.g., including filters, mixers, oscillators, amplifiers, etc.), and/or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The high-power wireless communication circuitry may include or be coupled to one or more antennas 308.

Note that, if desired, the high-power wireless communication circuitry 306 may include a discrete processing element in addition to processing element 304; for example, processing element 304 may be an 'application processor' while high-power wireless communication circuitry 306 may include its own 'baseband processor'. The high-power wireless communication circuitry 306 may also include a discrete memory element in addition to the memory 302. The discrete memory element of the high-power wireless communication circuitry 306 may include any of a variety of types of memory, and may, for example, store firmware or other software for execution by the discrete processing element of the high-power wireless communication circuitry 306 (e.g., for execution by a baseband processor). Alternatively (or in addition), processing element 304 may provide processing capability for the high-power wireless communication circuitry 306. The device 300 may be capable of communicating using any of various high-power wireless communication technologies by way of the high-power wireless communication circuitry 306 and antenna(s) 308. "High-power" wireless communication technologies may include any full-power or standard-power wireless communication technology, such as (but not limited to) Wi-Fi or any of various cellular RATs.

The device 300 may also include low-power wireless communication circuitry 310. The low-power wireless communication circuitry 310 may include components similar to those of the high-power wireless communication circuitry 306. The low-power wireless communication circuitry may include or be coupled to one or more antennas 312.

The device 300 may be capable of communicating using any of various low-power wireless communication technologies by way of the low-power wireless communication circuitry 310 and antenna(s) 312. "Low-power" wireless communication technologies may include, for example, a communication technology developed for, or applicable to, power conservation or power-limited devices, such as (but not limited to) Bluetooth Low Energy ("Bluetooth LE" or "BLE").

In some embodiments, the high-power wireless communication circuitry 306 and the low-power wireless communication circuitry 310 may share a single antenna or set of antennas, such as the antenna(s) 308, and the antenna(s) 312 may be omitted. In some embodiments, various portions of one or more receive and/or transmit chains, baseband processor, and/or memory may be shared between the high-power wireless communication circuitry 306 and the low-power wireless communication circuitry 310.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, high-power wireless communication circuitry 306, antenna(s) 308, low-power wireless communication circuitry 310, and antenna(s) 312, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing any of various assisted wakeup services.

Figure 4:
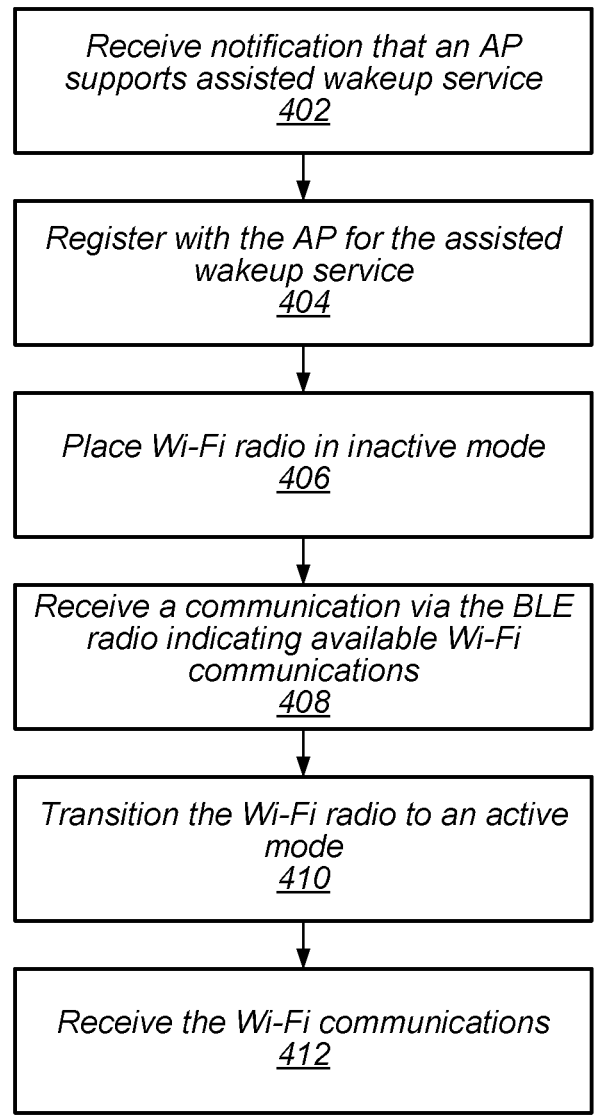
FIG. 4 is a flowchart diagram illustrating a method for implementing an assisted wakeup service for a high-power/low-power dual-radio STA using a high-power/low-power dual-radio AP, according to some embodiments.
Figure 5:
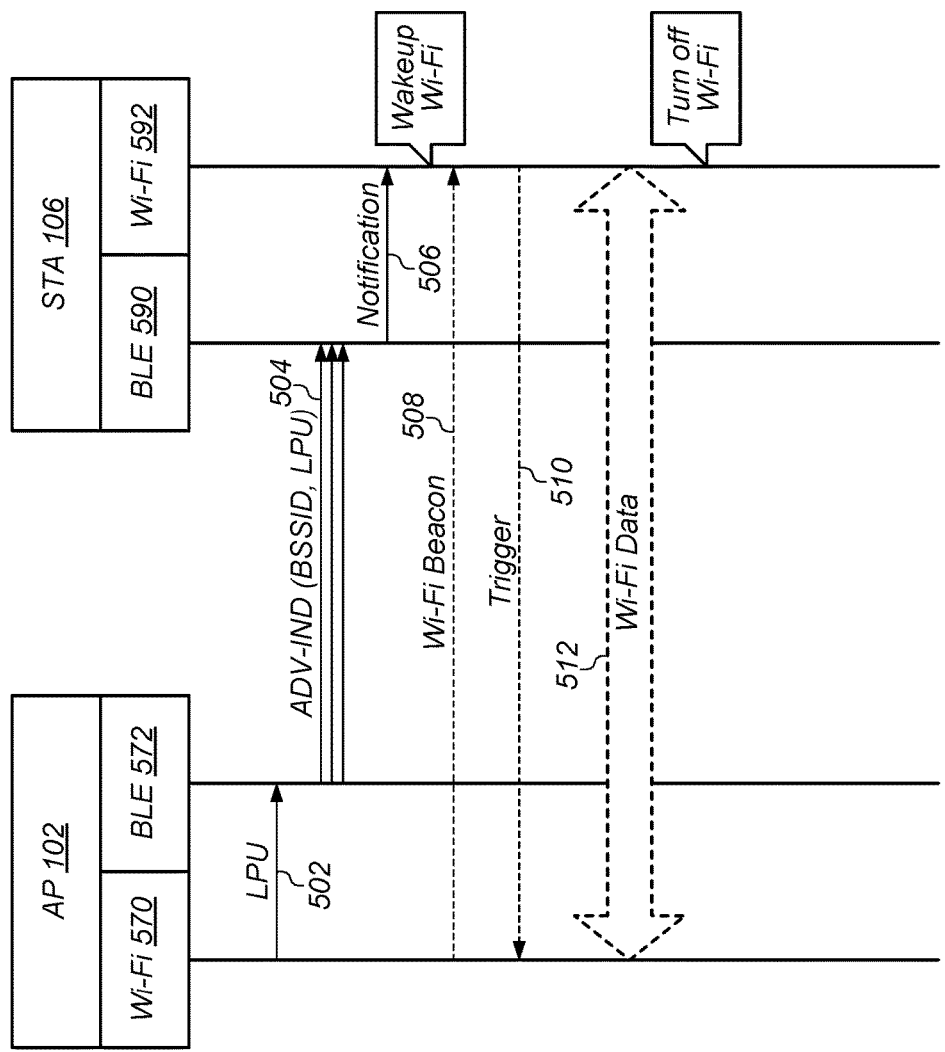
FIG. 5 is a signal flow diagram illustrating aspects of a method for implementing a passive assisted wakeup service using a high-power/low-power dual-radio AP with passive scanning by a STA, according to some embodiments.
Figure 6:
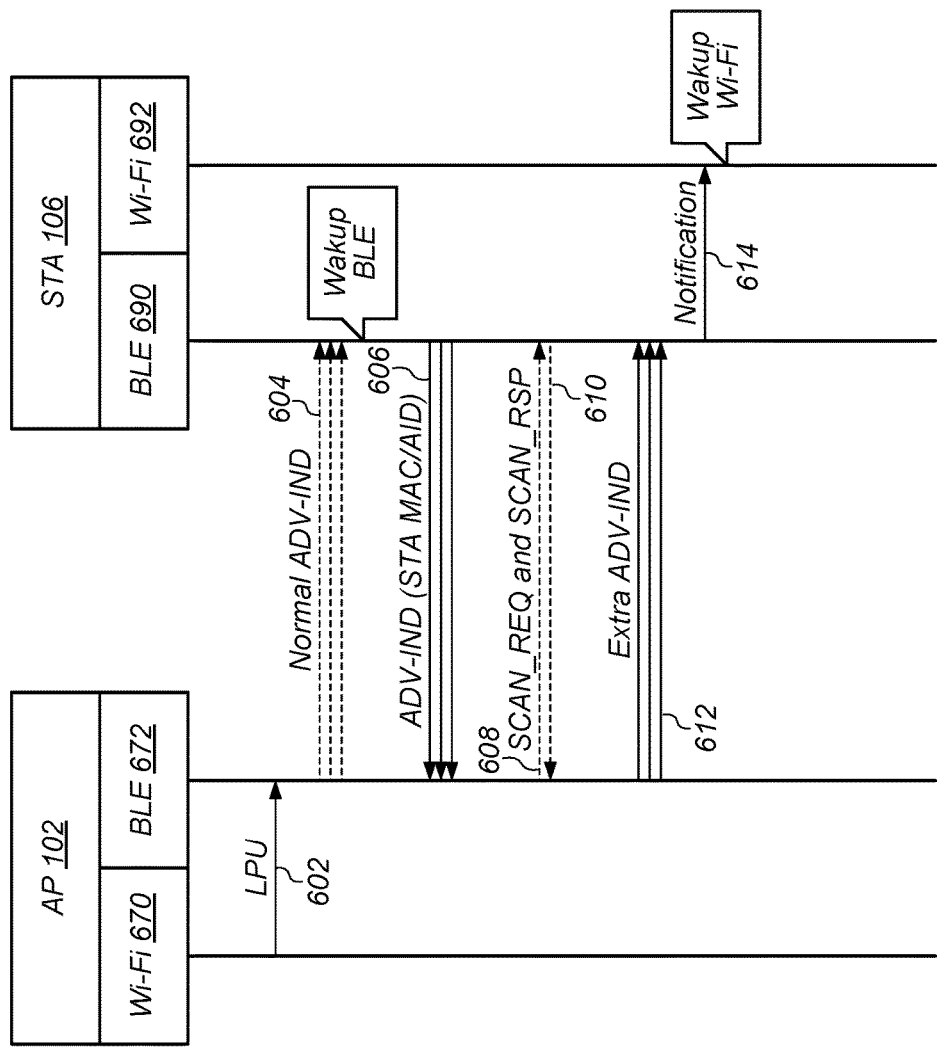
FIG. 6 is a signal flow diagram illustrating aspects of a method for implementing an active assisted wakeup service using a high-power/low-power dual-radio AP with active advertising by a STA, according to some embodiments.

FIGS. 4-6—Assisted Wakeup Service Using a High-Power/Low-Power Dual-Radio AP

Low power Wi-Fi devices, such as smart watches and Wi-Fi sensors, may consume much or most of their power to scan and/or trace Wi-Fi beacons from an AP. By tracing Wi-Fi beacons, the low-power Wi-Fi devices may obtain, e.g., pending unicast transmissions from the AP, operation parameter changes, and downlink multicast transmissions from AP.

To reduce Wi-Fi power consumption, low-power Wi-Fi devices may extend their beacon tracing period, e.g., from 100 ms (typical beacon interval), to 300 ms (typical multicast interval), or even longer. However, this may have negative results, including, e.g., increasing the latency in receiving downlink unicast transmissions, missing updated operation parameters, and missing multicast transmissions from the AP.

Thus, improvements are desired to significantly reduce Wi-Fi power consumption, but at the same time, eliminate or reduce the negative results caused by increasing the beacon tracing period. Low power wireless communication devices may also experience similar drawbacks when utilizing high-power radio technologies other than Wi-Fi. It should be understood that any methods or devices disclosed herein with regard to Wi-Fi may also (or alternatively) be implemented for such other high-power radio technologies.

A dual-radio AP, according to some embodiments, may include (and be configured to communicate via) both a high-power radio and a low-power radio. For example, an AP may include both a Wi-Fi radio and a BLE radio. The following discussion refers to example embodiments including a Wi-Fi/BLE dual radio AP. However, this is merely exemplary, and it should be understood that the methods and apparatuses discussed may also apply to an AP using a different high-power radio (e.g., a high-power radio configured to implement a communication protocol other than Wi-Fi) and/or a different low-power radio (e.g., a low-power radio configured to implement a communication protocol other than BLE).

In some embodiments, the Wi-Fi/BLE (or other high-power/low-power) dual-radio AP may support an assisted wakeup service. The AP may indicate this capability in periodic beacons via its high-power radio (e.g., Wi-Fi beacons) and/or its low-power radio (e.g., BLE advertising messages).

FIG. 4 is a flowchart diagram illustrating an exemplary method for a high-power/low-power (e.g., Wi-Fi/BLE) dual-radio STA to utilize such an assisted wakeup service, using a high-power/low-power (e.g., Wi-Fi/BLE) dual-radio AP, according to some embodiments. The method shown in FIG. 4 may be used in conjunction with any of the computer systems or devices shown in the above Figures, among other devices. Some of the method elements shown may be performed concurrently or in a different order than shown, or may be omitted. Additional method elements may also be performed as desired.

At 402, the power-limited dual-radio STA may discover the AP, e.g., in both the Wi-Fi and BLE interfaces, and in response may, at 404, register with the AP for the assisted wakeup service. Once registered, the power-limited STA may, at 406, disable its Wi-Fi radio (e.g., place the Wi-Fi radio in an inactive mode or otherwise initiate a lower-power mode), and rely on the BLE radio to communicate with the AP to find out whether there are pending Wi-Fi transmissions or updates from the AP. For example, the power-limited STA may, at 408, receive a BLE communication from the AP indicating that the AP has pending Wi-Fi transmissions or updates applicable to the power-limited STA. In response, the STA may, at 410, activate the Wi-Fi radio (e.g., transition the Wi-Fi radio from the inactive state to an active state). At 412, the STA may receive the pending Wi-Fi transmissions or updates from the AP.

Because Wi-Fi (or other high-power communication) often has greater range than BLE (or other low-power communication), the power-limited STA may, in some scenarios, leave the AP's BLE range, while remaining within the AP's Wi-Fi range. Thus, if the power-limited STA does not receive any BLE message from the AP for a long (e.g., predetermined) period, it may activate its Wi-Fi radio and perform Wi-Fi discovery (e.g., passively scanning for Wi-Fi beacons or actively transmitting probe request frames), and start tracing the AP's Wi-Fi beacons.

FIG. 5 is a signal flow diagram illustrating aspects of an exemplary method for implementing a passive assisted wakeup service using a high-power/low-power (e.g., Wi-Fi/BLE) dual-radio AP with passive scanning by a STA, according to some embodiments. FIG. 5 provides additional details regarding some embodiments according to the method of FIG. 4. Specifically, FIG. 5 illustrates an example signal flow for embodiments in which the STA receives Wi-Fi activity information from the AP using passive scanning of low-power messages, such as BLE advertising messages. As shown, an AP, such as the AP 102, may communicate with a mobile device, such as the STA 106. The AP 102 may include a Wi-Fi module (or other high-powered radio) 570 and a BLE module (or other low-powered radio) 572. The STA 106 may also include a Wi-Fi module (or other high-powered radio) 592 and a BLE module (or other low-powered radio) 590. The STA 106 may be a power-limited STA.

The AP's Wi-Fi module 570 may provide a Wi-Fi Low-Power Update (LPU) message 502 to the AP's BLE module 572, e.g., whenever there is a new LPU message available. The Wi-Fi LPU message 502 may include, e.g., any or all of the following information:

A BSSID of the AP, or a shortened BSSID, such as BSS Color.

Pending unicast and multicast transmissions, such as an 802.11 Traffic Indication Map (TIM). In some scenarios, the AP 102 may assign to each STA that registers for the assisted wakeup service an Association Identifier (AID) in a special AID block. In some embodiments, the LPU message may include the TIM only for the special AID block, in order to reduce the size of the included TIM.

A counter counting down to the next multicast transmission.

A Wi-Fi beacon update sequence number, such as an 802.11 Check Beacon field.

The BLE module 572 of the AP 102 may periodically transmit a BLE advertising message 504. The BLE module 572 may include the Wi-Fi LPU message 502 in one or more such BLE advertising messages. For example, in some embodiments, the BLE advertising message 504 may include the most recently received Wi-Fi LPU message. In other embodiments, the BLE advertising message 504 may include the Wi-Fi LPU message 502 only if received since the previous BLE advertising message.

The STA 106 may operate in a passive assisted wakeup service mode, e.g., in response to registering with the AP for the assisted wakeup service. Specifically, when operating in the passive assisted wakeup service mode, the STA 106 may disable (e.g., invoke a low-power state or mode) its Wi-Fi module 592. The BLE module 590 may also be in a sleep mode (or other reduced-power mode), and may periodically wake up (e.g., enter an active mode) to scan for the BLE advertising message 504. Upon receiving the BLE advertising message 504 from the AP 102, the BLE module 590 (or other component of the STA 106) may examine the included Wi-Fi LPU message 502. If the Wi-Fi LPU message 502 shows that the AP 102 has pending Wi-Fi transmissions or operation updates for the STA 106 (e.g., if a TIM included in the LPU message 502 indicates that the AP 102 has frames buffered for the STA 106), then the BLE module 590 (or other component of the STA 106) may provide a notification 506 to the Wi-Fi module 592.

In response to the notification 506, the Wi-Fi module 592 of the STA 106 may turn on (e.g., enter an active mode) and solicit the pending transmissions or operation updates from the AP 102. For example, once active, the Wi-Fi module 592 may receive a Wi-Fi beacon 508 from the Wi-Fi module 570 of the AP 102; transmit trigger 510 to the Wi-Fi module 570; and transmit and/or receive data via traditional Wi-Fi data communications 512. In some scenarios, the Wi-Fi module 592 may turn on in time to receive the next multicast transmission, as may be indicated in the Wi-Fi LPU. Upon completion of the Wi-Fi data communications 512, the STA 106 may once again disable the Wi-Fi module 592, and return to the assisted wakeup service mode.

The preceding signal flow of FIG. 5 may be repeated when a new Wi-Fi LPU message becomes available.

FIG. 6 is a signal flow diagram illustrating aspects of an exemplary method for implementing an active assisted wakeup service using a high-power/low-power (e.g., Wi-Fi/BLE) dual-radio AP with active advertising by a STA, according to some embodiments. FIG. 6 provides additional details regarding some embodiments according to the method of FIG. 4. Specifically, FIG. 6 illustrates an example signal flow for embodiments in which the STA, rather than passively scanning for BLE advertising messages from the AP, actively advertises a request for a BLE advertising message, which may include a Wi-Fi update. As shown, an AP, such as the AP 102, may communicate with a mobile device, such as the STA 106. The AP 102 may include a Wi-Fi module (or other high-powered radio) 670 and a BLE module (or other low-powered radio) 672. The STA 106 may also include a Wi-Fi module (or other high-powered radio) 692 and a BLE module (or other low-powered radio) 690. The STA 106 may be a power-limited STA.

The AP's Wi-Fi module 670 may provide a Wi-Fi Low-Power Update (LPU) message 602 to the AP's BLE module 672, e.g., whenever there is a new LPU message available. The Wi-Fi LPU 602 message may be similar to the Wi-Fi LPU message 502 of FIG. 5. The BLE module 672 of the AP 102 may periodically transmit a BLE advertising message 604. As in the method of FIG. 5, the BLE 672 may include the Wi-Fi LPU message 602 in one or more such BLE advertising messages.

However, in the method of FIG. 6, the STA 106 may not receive the BLE advertising message 604. Specifically, the STA 106 may operate in an active assisted wakeup service mode, e.g., in response to registering with the AP for the assisted wakeup service. Specifically, when operating in the active assisted wakeup service mode, the STA 106 may disable its Wi-Fi module 692. The BLE module 690 may also be in a sleep mode (or other reduced-power mode), and, unlike in the passive assisted wakeup service mode of FIG. 5, may not periodically wake up to scan for the BLE advertising message 604. Instead, the BLE module 690 may periodically wake up to transmit its own BLE advertising message 606. The BLE advertising message 606 may include, e.g., a MAC address and/or AID of the STA 106.

The BLE module 672 of the AP 102 may scan (e.g., continuously) for BLE advertising messages from STAs such as the STA 106. Upon receiving the BLE advertising message 606 from the BLE module 690 of the STA 106, the BLE module 672 may transmit a scan request message 608 to the STA 106. If the BLE module 672 of the AP 102 has a new Wi-Fi LPU 602 for the STA 102 106, then the scan request message 608 may include an indication that the BLE module 672 will transmit one or more extra BLE advertising messages 612 upon receiving a scan response message 610 from the BLE module 690 of the STA 106. If the BLE module 672 of the AP 102 does not have a new Wi-Fi LPU 602 for the STA 106, then Otherwise, the scan request message 608 may merely indicate to the STA 106 that the AP 102 is still within a BLE range of the STA 106. Alternatively, if the BLE module 672 of the AP 102 does not have a new Wi-Fi LPU 602 for the STA 106, then the AP 102 may not transmit the scan request message 608.

If the STA 106 does not receive, within a predetermined time, the scan request message 608, indicating that the BLE module 672 will transmit one or more extra BLE advertising messages 612, then the BLE module 690 may return to the sleep mode. It should be appreciated that some communication protocols may be defined such that the STA 106 may expect a predetermined response, such as the scan request message 608, in response to the BLE advertising messages 612. Additionally, some communication protocols may be defined such that the predetermined time for receiving the scan request message 608 is very short. For these or other reasons, the AP may not immediately transmit the Wi-Fi LPU 602 in response to receiving the BLE advertising message 606, but may instead first exchange the scan request message 608 and the scan response message 610.

In some embodiments, the BLE module 672 of the AP 102 may use a BLE scanner filter to capture and process BLE advertising messages from STAs registered for the active assisted wakeup service, and to transmit scan request messages only to those STAs.

In response to receiving the scan request message 608, the BLE module 690 may transmit the scan response message 610, which may indicate that the BLE module 690 will be available to receive the extra BLE advertising message 612. In some embodiments, the BLE module 690 of the STA 106 may use a BLE advertising filter to capture and process scan request messages only from the AP 102, and to transmit a scan response message only to that AP.

Upon receiving the scan response message 610, the BLE module 672 may transmit the extra BLE advertising message 612, which may include the Wi-Fi LPU message 602.

Upon receiving the extra BLE advertising message 612 from the AP 102, the BLE module 690 (or other component of the STA 106) may examine the included Wi-Fi LPU message 602. If the Wi-Fi LPU message 602 shows that the AP 102 has pending Wi-Fi transmissions or operation updates for the STA 106 (e.g., if a TIM included in the LPU message 602 indicates that the AP 102 has frames buffered for the STA 106), then the BLE module 690 (or other component of the STA 106) may provide a notification 614 to the Wi-Fi module 692.

In response to the notification 614, the Wi-Fi module 692 of the STA 106 may turn on (e.g., enter an active mode), and solicit the pending transmissions or operation updates from the AP 102. For example, the Wi-Fi module 692 of the STA 106 and the Wi-Fi module 670 of the AP 102 may perform steps similar to steps 508-512 of FIG. 5.

In some scenarios, the active assisted wakeup service may be more power-efficient for the STA 106 than the passive assisted wakeup service of FIG. 5. For example, in the active assisted wakeup service mode, the BLE module 690 need not wake to receive every BLE advertising message from the AP 102. Instead, the BLE module 690 may request BLE advertising messages at a period of its choosing, and may receive the extra BLE advertising message only if a new Wi-Fi LPU message is available. The active assisted wakeup service may be less power-efficient for the AP 102. However, in typical use cases, the AP 102 may have less severe power limitations than the STA 106, especially if the STA 106 is power-limited.

Figures 7A, 7B:
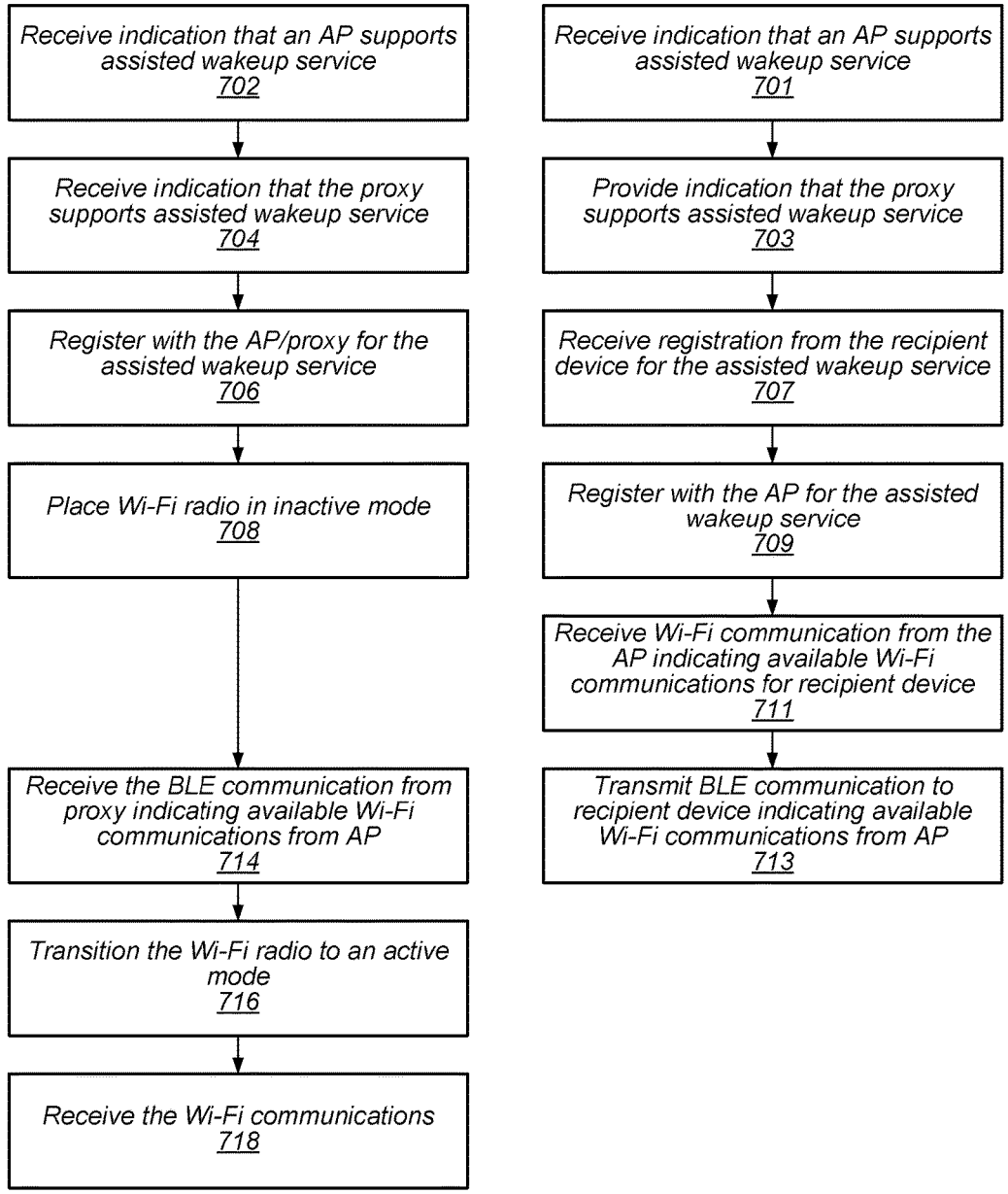
FIG. 7A is a flowchart diagram illustrating a method for implementing an assisted wakeup service for a high-power/low-power dual-radio STA using a high-power radio AP and a high-power/low-power dual-radio assisted wakeup service proxy, according to some embodiments.
FIG. 7B is a flowchart diagram illustrating a method for a high-power/low-power dual-radio assisted wakeup service proxy to implement an assisted wakeup service for a high-power/low-power dual-radio STA using a high-power radio AP, according to some embodiments.
Figure 8:
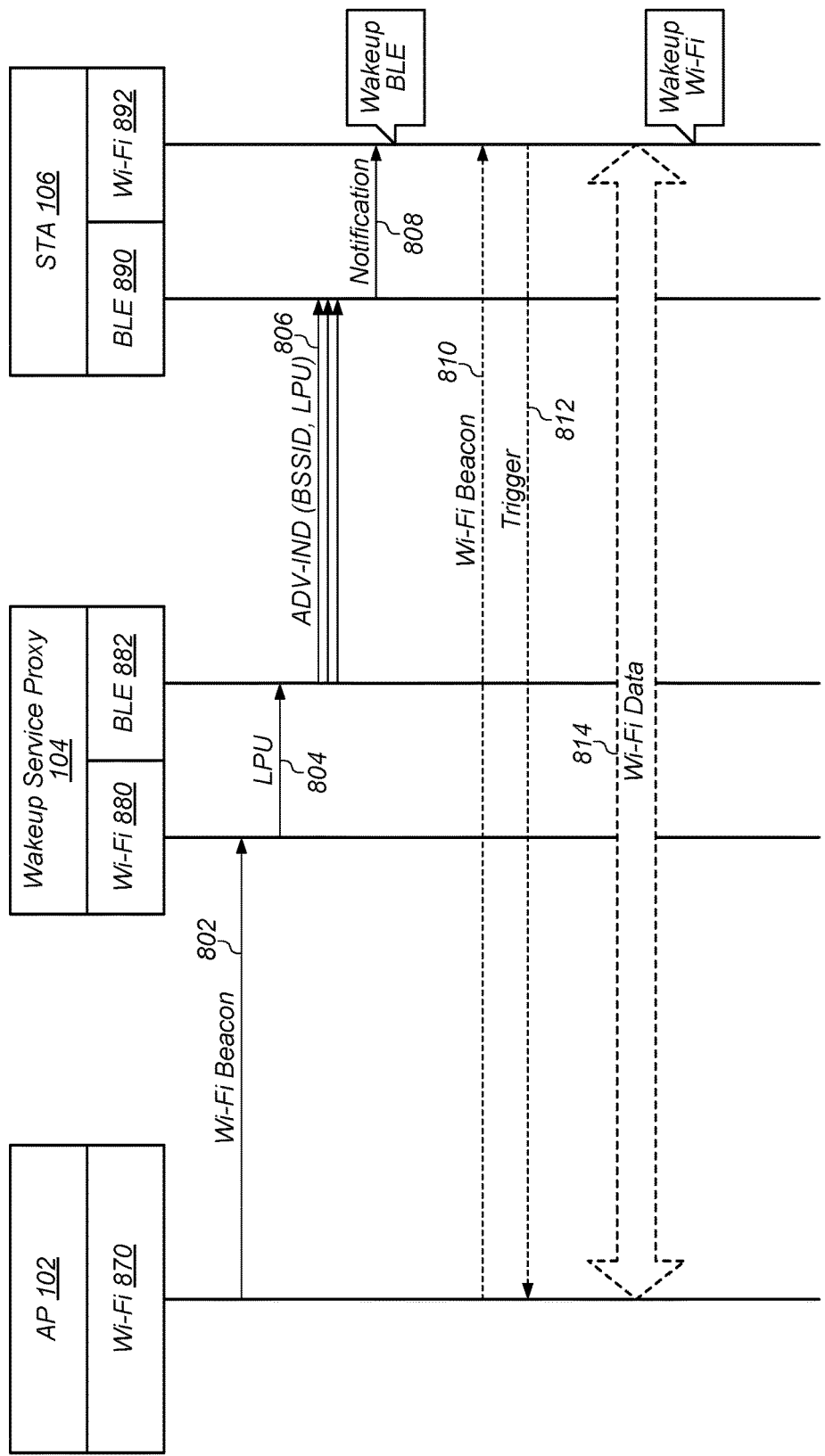
FIG. 8 is a signal flow diagram illustrating aspects of a method for implementing a passive assisted wakeup service using a high-power AP and a high-power/low-power dual-radio proxy, with passive scanning by a STA, according to some embodiments.
Figure 9:
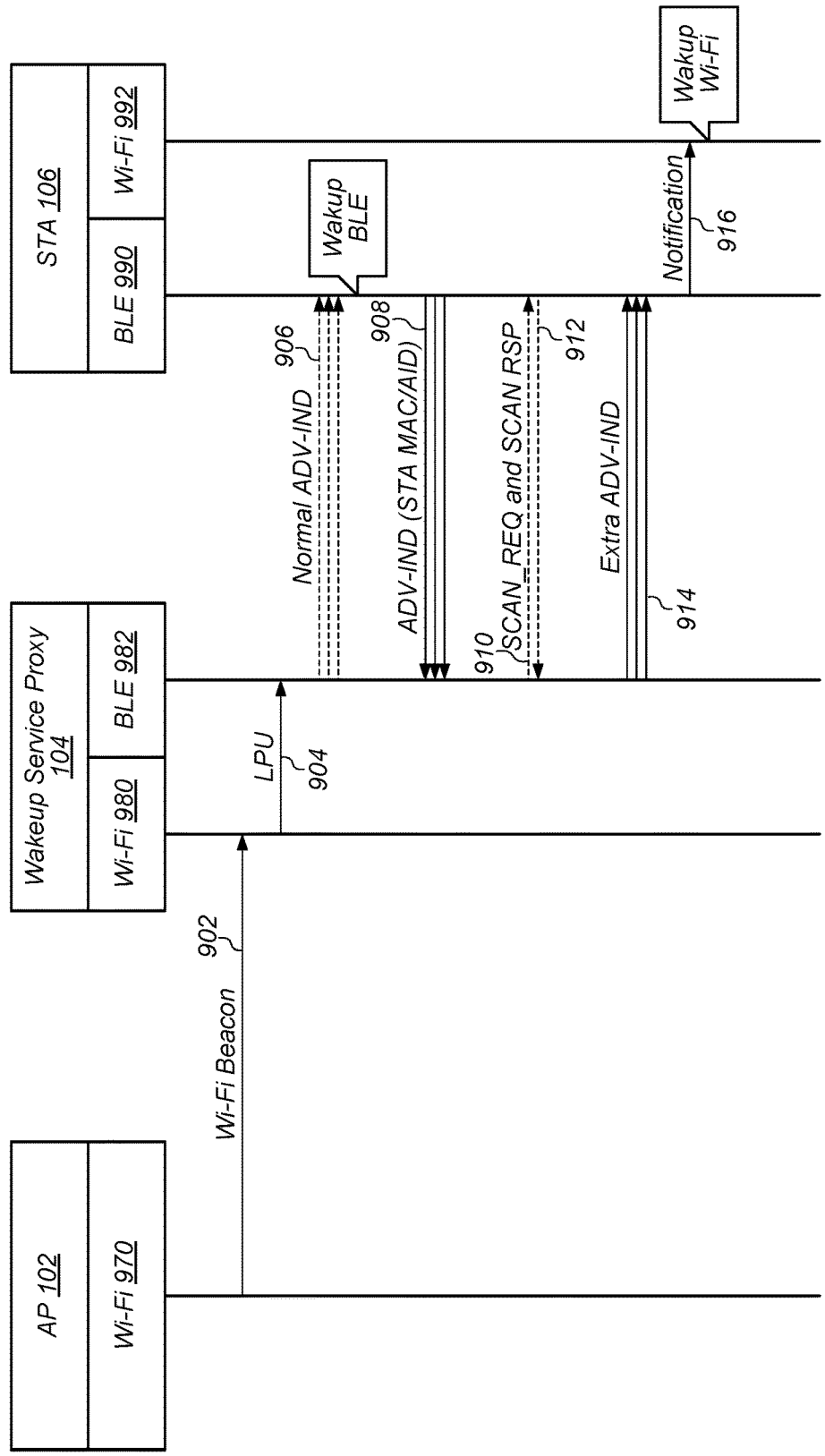
FIG. 9 is a signal flow diagram illustrating aspects of a method for implementing an active assisted wakeup service using a high-power AP and a high-power/low-power dual-radio proxy, with active advertising by a STA, according to some embodiments.

FIGS. 7-9—Assisted Wakeup Service Proxy

Many typical high-power APs (e.g., many Wi-Fi APs), do not include a low-power radio (e.g., a BLE radio). To address this deficiency, a high-power/low-power (e.g., Wi-Fi/BLE) dual-radio STA, with less severe power limitations than the power-limited STA, may serve as an assisted wakeup service proxy.

FIG. 7A is a flowchart diagram illustrating an exemplary method for a high-power/low-power (e.g., Wi-Fi/BLE) dual-radio STA to utilize such an assisted wakeup service, using a high-power (e.g., Wi-Fi) radio AP and a high-power/low-power (e.g., Wi-Fi/BLE) dual-radio assisted wakeup service proxy, according to some embodiments. FIG. 7B is a flowchart diagram illustrating an exemplary complementary method for the assisted wakeup service proxy to participate in the assisted wakeup service. The methods shown in FIGS. 7A and 7B may be used in conjunction with any of the computer systems or devices shown in the above Figures, among other devices. Some of the method elements shown may be performed concurrently or in a different order than shown, or may be omitted. Additional method elements may also be performed as desired.

At 701, the assisted wakeup service proxy may receive via its Wi-Fi radio an indication from the AP that the AP supports (e.g., is capable of performing, is configured to perform, etc.) the assisted wakeup service. The power-limited STA (also referred to as the "recipient device") may also receive a similar indication from the AP at 702. As noted above, such an indication may be included in a Wi-Fi beacon from the AP. In response to receiving the indication at 701, the assisted wakeup service proxy may, at 703, provide an indication to the power-limited STA (e.g., via a BLE beacon) that the proxy also supports the assisted wakeup service.

In response to receiving, at 702 and/or 704, the indications that the AP and the proxy support the assisted wakeup service, the power-limited STA may, at 706, register for the assisted wakeup service at the assisted wakeup service proxy and/or the AP, e.g., by transmitting a Wi-Fi request/instruction to the AP and/or transmitting a Wi-Fi or BLE request/instruction to the proxy. The proxy may receive the registration at 707, and in response may, at 709, register with the AP to act as an assisted wakeup service proxy for the power-limited STA.

The power-limited STA may, at 708, disable its Wi-Fi radio (e.g., place the Wi-Fi radio in an inactive mode, or otherwise initiate a lower-power mode), and rely on the BLE radio to communicate with the assisted wakeup service proxy to find out whether there are pending Wi-Fi transmissions or updates from the AP.

For example, the assisted wakeup service proxy may scan and trace the Wi-Fi beacons from the AP, and generate the Wi-Fi LPU on behalf of the AP. The assisted wakeup service proxy may periodically transmit BLE advertising messages with the Wi-Fi LPU. Specifically, in response to receiving, at 711 a Wi-Fi communication (e.g., beacon) from the AP indicating that the AP has pending Wi-Fi transmissions or updates applicable to the power-limited STA, the proxy may, at 713, include the Wi-Fi LPU in a subsequent BLE advertising message.

The low-power STA may, at 716, activate its Wi-Fi radio (e.g., transition the Wi-Fi radio to an active state) when it detects pending Wi-Fi transmissions or updates from the AP, via the assisted wakeup service proxy at 714. The low-power STA may then receive the pending Wi-Fi transmissions or updates from the AP at 718.

The power-limited STA may, in some scenarios, leave the proxy's BLE range, while remaining within the AP's Wi-Fi range, or the proxy may leave the AP's Wi-Fi range, thus becoming ineligible to continue to act as an assisted wakeup service proxy. Thus, if the power-limited STA does not receive any BLE message from the proxy for a long (e.g., predetermined) period, it may activate its Wi-Fi radio and perform Wi-Fi discovery (e.g., passively scanning for Wi-Fi beacons or actively transmitting probe request frames), and start to trace the AP's Wi-Fi beacons.

FIG. 8 is a signal flow diagram illustrating aspects of an exemplary method for implementing a passive assisted wakeup service using a high-power (e.g., Wi-Fi) AP and a high-power/low-power (e.g., Wi-Fi/BLE) dual-radio proxy, with passive scanning by a STA, according to some embodiments. FIG. 8 provides additional details regarding some embodiments according to the methods of FIG. 7A and FIG. 7B. Specifically, FIG. 8 illustrates an example signal flow for embodiments in which the STA receives Wi-Fi activity information from the proxy, using passive scanning of BLE advertising messages. As shown, an AP, such as the AP 102, may communicate via Wi-Fi (or other high-power communication) with a mobile device, such as the STA 106, and with an assisted wakeup service proxy, which may also be a mobile device or other wireless device, such as the STA 104. The STA 106 may communicate with the proxy 104 via BLE (or other low-power communication). The AP 102 may include a Wi-Fi module (or other high-powered radio) 870. The assisted wakeup service proxy 104 may include a Wi-Fi module (or other high-powered radio) 880 and a BLE module (or other low-powered radio) 882. The STA 106 may also include a Wi-Fi module (or other high-powered radio)

892 and a BLE module (or other low-powered radio) 890. The STA 106 may be a power-limited STA.

The AP's Wi-Fi module 870 may periodically transmit a Wi-Fi beacon 802, which may include, e.g., any or all of the following information:
- A BSSID of the AP, or a shortened BSSID, such as BSS Color.
- Pending unicast and multicast transmissions, such as an 802.11 Traffic Indication Map (TIM). In some scenarios, the AP 102 may assign to each STA that registers for the assisted wakeup service an AID in a special AID block. In some embodiments, the Wi-Fi beacon 802 may include the TIM only for the special AID block, in order to reduce the size of the included TIM.
- A counter counting down to next multicast transmission.
- A Wi-Fi beacon update sequence number, such as an 802.11 Check Beacon field.

Upon receiving the Wi-Fi beacon 802, the Wi-Fi module 880 of the proxy 104 may provide a Wi-Fi LPU message 804 to the proxy's BLE module 882. The Wi-Fi LPU message 804 may include some or all of the information included in the Wi-Fi beacon 802, such as the information listed above.

The BLE module 882 of the proxy 104 may periodically transmit a BLE advertising message 806. The BLE module 882 may include the Wi-Fi LPU message 804 in one or more such BLE advertising messages. For example, in some embodiments, the BLE advertising message 806 may include the most recently received Wi-Fi LPU message. In other embodiments, the BLE advertising message 806 may include the Wi-Fi LPU message 804 only if received since the previous BLE advertising message.

The STA 106 may operate in a passive assisted wakeup service mode, e.g., in response to registering with the AP and/or the proxy for the assisted wakeup service. Specifically, when operating in the passive assisted wakeup service mode, the STA 106 may disable (e.g., invoke a low-power state or mode) its Wi-Fi module 892. The BLE module 890 may also be in a sleep mode (or other reduced-power mode), and may periodically wake up (e.g., enter an active mode) to scan for the BLE advertising message 806. Upon receiving the BLE advertising message 806 from the proxy 104, the BLE module 890 (or other component of the STA 106) may examine the included Wi-Fi LPU message 804. If the Wi-Fi LPU message 804 shows that the AP 102 has pending Wi-Fi transmissions or operation updates for the STA 106 (e.g., if a TIM included in the LPU message 804 indicates that the AP 102 has frames buffered for the STA 106), then the BLE module 890 (or other component of the STA 106) may provide a notification 808 to the Wi-Fi module 892.

In response to the notification 808, the Wi-Fi module 892 of the STA 106 may turn on (e.g., enter an active mode) and solicit the pending transmissions or operation updates from the AP 102. For example, once active, the Wi-Fi module 892 may receive a Wi-Fi beacon 810 from the Wi-Fi module 870 of the AP 102; transmit trigger 812 to the Wi-Fi module 870; and transmit and/or receive data via traditional Wi-Fi data communications 814. Upon completion of the Wi-Fi data communications 814, the STA 106 may once again disable the Wi-Fi module 892, and return to the assisted wakeup service mode.

The preceding signal flow of FIG. 8 may be repeated when a new Wi-Fi beacon message is transmitted by the AP 102.

FIG. 9 is a signal flow diagram illustrating aspects of an exemplary method for implementing an active assisted wakeup service using a high-power (e.g., Wi-Fi) AP and a high-power/low-power (e.g., Wi-Fi/BLE) dual-radio proxy, with active advertising by a STA, according to some embodiments. FIG. 9 provides additional details regarding some embodiments according to the methods of FIG. 7A and FIG. 7B. Specifically, FIG. 9 illustrates an example signal flow for embodiments in which the STA, rather than passively scanning for BLE advertising messages from the proxy, actively advertises a request for a BLE advertising message, which may include a Wi-Fi update. As shown, an AP, such as the AP 102, may communicate via Wi-Fi (or other high-power communication) with a mobile device, such as the STA 106, and with an assisted wakeup service proxy, which may also be a mobile device or other wireless device, such as the STA 104. The STA 106 may communicate with the proxy 104 via BLE (or other low-power communication). The AP 102 may include a Wi-Fi module (or other high-powered radio) 970. The assisted wakeup service proxy 104 may include a Wi-Fi module (or other high-powered radio) 980 and a BLE module (or other low-powered radio) 982. The STA 106 may also include a Wi-Fi module (or other high-powered radio) 992 and a BLE module (or other low-powered radio) 990. The STA 106 may be a power-limited STA.

The AP's Wi-Fi module 970 may periodically transmit a Wi-Fi beacon 902, which may by similar to the Wi-Fi beacon 802 of FIG. 8. Upon receiving the Wi-Fi beacon 902, the Wi-Fi module 980 of the proxy 104 may provide a Wi-Fi LPU message 904 to the proxy's BLE module 982. The Wi-Fi LPU message 904 may include some or all of the information included in the Wi-Fi beacon 902.

The BLE module 982 of the proxy 104 may periodically transmit a BLE advertising message 906. As in the method of FIG. 8, the BLE module 982 may include the Wi-Fi LPU message 904 in one or more such BLE advertising messages.

However, in the method of FIG. 9, the STA 106 may not receive the BLE advertising message 906. Specifically, the STA 106 may operate in an active assisted wakeup service mode, e.g., in response to registering with the AP 102 and/or the proxy 104 for the assisted wakeup service. Specifically, when operating in the active assisted wakeup service mode, the STA 106 may disable its Wi-Fi module 992. The BLE module 990 may also be in a sleep mode (or other reduced-power mode), and, unlike in the passive assisted wakeup service mode of FIG. 8, may not periodically wake up to scan for the BLE advertising message 906. Instead, the BLE module 990 may periodically wake up to transmit its own BLE advertising message 908. The BLE advertising message 908 may include a MAC address and/or AID of the STA 106.

The BLE module 982 of the proxy 104 may scan (e.g., continuously) for BLE advertising messages from STAs such as the STA 106. Upon receiving the BLE advertising message 908 from the BLE module 990 of the STA 106, the BLE module 982 may transmit a scan request message 910 to the STA 106. If the BLE module 982 of the proxy 104 has a new Wi-Fi LPU 904 for the STA 106, then the scan request message 910 may include an indication that the BLE module 982 will transmit one or more extra BLE advertising messages 914 upon receiving a scan response message 912 from the BLE module 990 of the STA 106. If the BLE module 982 of the proxy 104 does not have a new Wi-Fi LPU 904 for the STA 106, then the scan request message 910 may merely indicate to the STA 106 that the proxy 104 is still within a BLE range of the STA 106. Alternatively, if the BLE module 982 of the proxy 104 does not have a new Wi-Fi LPU 904 for the STA 106, then the AP 102 may not transmit the scan request message 910.

If the STA 106 does not receive, within a predetermined time, the scan request message 910, indicating that the BLE module 982 will transmit one or more extra BLE advertising messages 914, then the BLE module 990 may return to the sleep mode.

In some embodiments, the BLE module 982 of the proxy 104 may use a BLE scanner filter to capture and process BLE advertising messages from STAs registered for the active assisted wakeup service, and to transmit scan request messages only to those STAs.

In response to receiving the scan request message 910, the BLE module 990 may transmit the scan response message 912, which may indicate that the BLE module 990 will be available to receive the extra BLE advertising message 914. In some embodiments, the BLE module 990 of the STA 106 may use a BLE advertising filter to capture and process scan request messages only from the proxy 104, and to transmit a scan response message only to that device.

Upon receiving the scan response message 912, the BLE module 982 may transmit the extra BLE advertising message 914, which may include the Wi-Fi LPU message 904.

Upon receiving the extra BLE advertising message 914 from the proxy 104, the BLE module 990 (or other component of the STA 106) may examine the included Wi-Fi LPU message 904. If the Wi-Fi LPU message 904 shows that the AP 102 has pending Wi-Fi transmissions or operation updates for the STA 106 (e.g., if a TIM included in the LPU message 904 indicates that the AP 102 has frames buffered for the STA 106), then the BLE module 990 (or other component of the STA 106) may provide a notification 916 to the Wi-Fi module 992.

In response to the notification 916, the Wi-Fi module 992 of the STA 106 may turn on (e.g., enter an active mode), and solicit the pending transmissions or operation updates from the AP 102. For example, the Wi-Fi module 992 of the STA 106 and the Wi-Fi module 970 of the AP 102 may perform steps similar to steps 810-814 of FIG. 8.

As noted above, in some scenarios, the active assisted wakeup service may be more power-efficient for the STA 106 than the passive assisted wakeup service of FIG. 8. For example, in the active assisted wakeup service mode, the BLE module 990 need not wake to receive every BLE advertising message from the proxy 104. The active assisted wakeup service may be less power-efficient for the proxy 104. However, this may be acceptable in some scenarios, such as where the STA 106 is power-limited, and the proxy 104 is a less power-constrained device. For example, in some scenarios, if the STA 104 is a mobile device, then the STA 104 may function as a wakeup service proxy, and/or may function as an active wakeup service proxy (e.g., may provide an indication at 703), only while connected to an outside (e.g., non-depleting) power source.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless communication device, comprising:
a high-power communication module configured to communicate according to a first communication protocol;
a low-power communication module configured to communicate according to a second, different communication protocol; and
at least one processor communicatively coupled to the high-power communication module and the low-power communication module, wherein the at least one processor is configured to execute software instructions to cause the wireless communication device to:
receive from an access point a first beacon according to the first communication protocol, wherein the first beacon indicates that the access point is capable of including in a low-power update (LPU) message, according to the second communication protocol, an indication that the access point has data available to send to the wireless communication device according to the first communication protocol;
after receiving the first beacon, transition the high-power communication module to an inactive state;
receive the LPU message via the low-power communication module, according to the second communication protocol, while the high-power communication module is in an inactive state;
determine that the LPU message comprises a traffic indication map (TIM) indicating that the access point has data available to send to the wireless communication device according to the first communication protocol;
in response to the determining, transition the high-power communication module from the inactive state to an active state; and
receive a data message including the data via the high-power communication module while the high-power communication module is in the active state.

2. The wireless communication device of claim 1, wherein the first communication protocol is a Wi-Fi protocol, and the second communication protocol is a Bluetooth Low Energy protocol.

3. The wireless communication device of claim 1, wherein the LPU message is received from the access point.

4. The wireless communication device of claim 1, wherein the LPU message is received from a proxy device that is not the access point.

5. The wireless communication device of claim 1, wherein the low-power communication module is configured to periodically transition from an inactive state to an active state to scan for the LPU message.

6. The wireless communication device of claim 1, wherein the low-power communication module is configured to transmit an advertisement message, wherein the LPU message is responsive to the advertisement message.

7. The wireless communication device of claim 1, wherein the at least one processor is configured to execute software instructions to further cause the wireless communication device to:
  transition the low-power communication module from an inactive state to an active state, while the high-power communication module is in the inactive state;
  responsive to the transitioning, transmit an advertisement message via the low-power communication module, according to the second communication protocol;
  determine whether a scan request message was received via the low-power communication module, responsive to the advertisement message, within a predetermined amount of time following the transmitting the advertisement message;
  in response to determining that the scan request message was not received within the predetermined amount of time:
    transition the low-power communication module from the active state to the inactive state; and
  in response to determining that the scan request message was received within the predetermined amount of time:
    transmit a scan response message via the low-power communication module, indicating that the wireless communication device will scan for further communication according to the second communication protocol, wherein the LPU message is responsive to the scan response message.

8. The wireless communication device of claim 1, wherein the at least one processor is configured to execute software instructions to further cause the wireless communication device to:
  instruct the access point to include in the LPU message according to the second communication protocol, an indication that the access point has data available to send to the wireless communication device according to the first communication protocol; and
  cause the high-power communication module to enter the inactive state after the instructing.

9. The wireless communication device of claim 1, wherein the at least one processor is configured to execute software instructions to further cause the wireless communication device to:
  receive from the access point a beacon according to the first communication protocol, wherein the beacon indicates that the access point is capable of including in the LPU message, according to the second communication protocol, an indication that the access point has data available to send to the wireless communication device according to the first communication protocol.

10. A non-transitory computer-readable medium storing software instructions executable by a processor of a wireless communication device to cause the wireless communication device to:
  receive from an access point, via a high-power communication module of the wireless communication device, a first beacon according to a high-power communication protocol, wherein the first beacon indicates that the access point is capable of including in a low-power update (LPU) message, according to a low-power communication protocol, an indication that the access point has data available to send to the wireless communication device according to the high-power communication protocol;
  after receiving the first beacon, transition the high-power communication module to an inactive state;
  receive the LPU message via the low-power communication module of the wireless communication device, according to the low-power communication protocol, while the high-power communication module of the wireless communication device is in the inactive state;
  determine that the LPU message comprises a traffic indication map (TIM) indicating that the access point has data available to send to the wireless communication device according to the high-power communication protocol;
  in response to the determining, transition the high-power communication module from the inactive state to an active state; and
  receive a data message including the data via the high-power communication module while the high-power communication module is in the active state.

11. The non-transitory computer-readable medium of claim 10, wherein the LPU message is received from the access point.

12. The non-transitory computer-readable medium of claim 10, wherein the LPU message is received from a proxy device that is not the access point.

13. The non-transitory computer-readable medium of claim 10, wherein the software instructions are further executable to cause the wireless communication device to:
  transition the low-power communication module from an inactive state to an active state, while the high-power communication module is in the inactive state;
  responsive to the transitioning, transmit an advertisement message via the low-power communication module, according to the low-power communication protocol;
  determine whether a scan request message was received via the low-power communication module, responsive to the advertisement message, within a predetermined amount of time following the transmitting the advertisement message;
  in response to determining that the scan request message was not received within the predetermined amount of time:
    transition the low-power communication module from the active state to the inactive state; and
  in response to determining that the scan request message was received within the predetermined amount of time:
    transmit a scan response message via the low-power communication module, indicating that the wireless communication device will scan for further communication according to the low-power communication protocol, wherein the LPU message is responsive to the scan response message.

14. A method for performing an assisted wakeup service, the method comprising:
  by a wireless communication device:
    receiving from an access point, via a high-power communication module of the wireless communication device, a first beacon according to a high-power communication protocol, wherein the first beacon indicates that the access point is capable of including in a low-power update (LPU) message, according to a low-power communication protocol, an indication that the access point has data available to send to the wireless communication device according to the high-power communication protocol;

after receiving the first beacon, transitioning the high-power communication module to an inactive state;

receiving the LPU message via the low-power communication module of the wireless communication device, according to the low-power communication protocol, while the high-power communication module of the wireless communication device is in the inactive state;

determining that the LPU message comprises a traffic indication map (TIM) indicating that the access point has data available to send to the wireless communication device according to the high-power communication protocol;

in response to the determining, transitioning the high-power communication module from the inactive state to an active state; and receiving a data message including the data via the high-power communication module while the high-power communication module is in the active state.

15. The method of claim 14, wherein the LPU message is received from the access point.

16. The method of claim 14, wherein the LPU message is received from a proxy device that is not the access point.

17. The method of claim 14, wherein the software instructions are further executable to cause the wireless communication device to:

transmit, via the low-power communication module, an advertisement message, wherein the LPU message is responsive to the advertisement message.

* * * * *